United States Patent
Wu

(10) Patent No.: US 12,021,584 B2
(45) Date of Patent: Jun. 25, 2024

(54) NETWORK NODE AND METHOD IN A WIRELESS COMMUNICATIONS NETWORK

(71) Applicant: Telefonaktiebolaget LM Ericsson (publ), Stockholm (SE)

(72) Inventor: Ping Wu, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 248 days.

(21) Appl. No.: 17/606,203

(22) PCT Filed: Apr. 23, 2019

(86) PCT No.: PCT/SE2019/050369
§ 371 (c)(1),
(2) Date: Oct. 25, 2021

(87) PCT Pub. No.: WO2020/218955
PCT Pub. Date: Oct. 29, 2020

(65) Prior Publication Data
US 2022/0224384 A1    Jul. 14, 2022

(51) Int. Cl.
*H04B 7/0456*    (2017.01)
(52) U.S. Cl.
CPC .................. *H04B 7/0456* (2013.01)
(58) Field of Classification Search
CPC .... H04B 7/0456; H04B 7/0404; H04B 7/063; H04B 7/0639; H04B 7/0413; H04B 7/0417
See application file for complete search history.

(56) References Cited

U.S. PATENT DOCUMENTS

2015/0065153 A1    3/2015    Nissila et al.

FOREIGN PATENT DOCUMENTS

WO    2015023218 A1    2/2015

OTHER PUBLICATIONS

International Search Report and Written Opinion for International Patent Application No. PCT/SE2019/050369, dated Jan. 3, 2020, 10 pages.

*Primary Examiner* — Betsy Deppe
(74) *Attorney, Agent, or Firm* — Withrow & Terranova, PLLC

(57) ABSTRACT

A method performed by a network node for handling a Single User (SU) Multiple Input Multiple Output (MIMO) transmission from a User Equipment (UE) in a wireless communications network is provided. The network node selects an allowed precoding matrix set for the SU MIMO transmission. The network node further estimates a raw covariance matrix for the SU MIMO transmission, based on a Demodulation Reference Signal, DMRS, of a Physical Uplink Shared Channel, PUSCH, received from the UE. The network node then selects a precoding matrix and a rank for the SU MIMO transmission, based on the estimated raw covariance matrix and the selected allowed precoding matrix set.

9 Claims, 7 Drawing Sheets

200. Instruct the UE to use a number of selected precoding matrices to transmit the same number of PUSCH transmissions comprising data and the DMRS.

201. Select an allowed precoding matrix set for the SU MIMO transmission.

202. Estimate full rank precoding matrix over a number of TTIs.

203. Estimate a precoded covariance matrix based on channel estimation according to the DMRS of the PUSCH received from the UE.

204. Estimate a raw covariance matrix for the SU MIMO transmission, based on the DMRS of the PUSCH.

205 and 206. Select a precoding matrix and a rank for the SU MIMO transmission, based on the estimated raw covariance matrix and the selected allowed precoding matrix set.

207. Send to the UE, the selected rank and a precoding matrix indicator based on the selected precoding matrix for the SU MIMO transmission.

Fig. 2

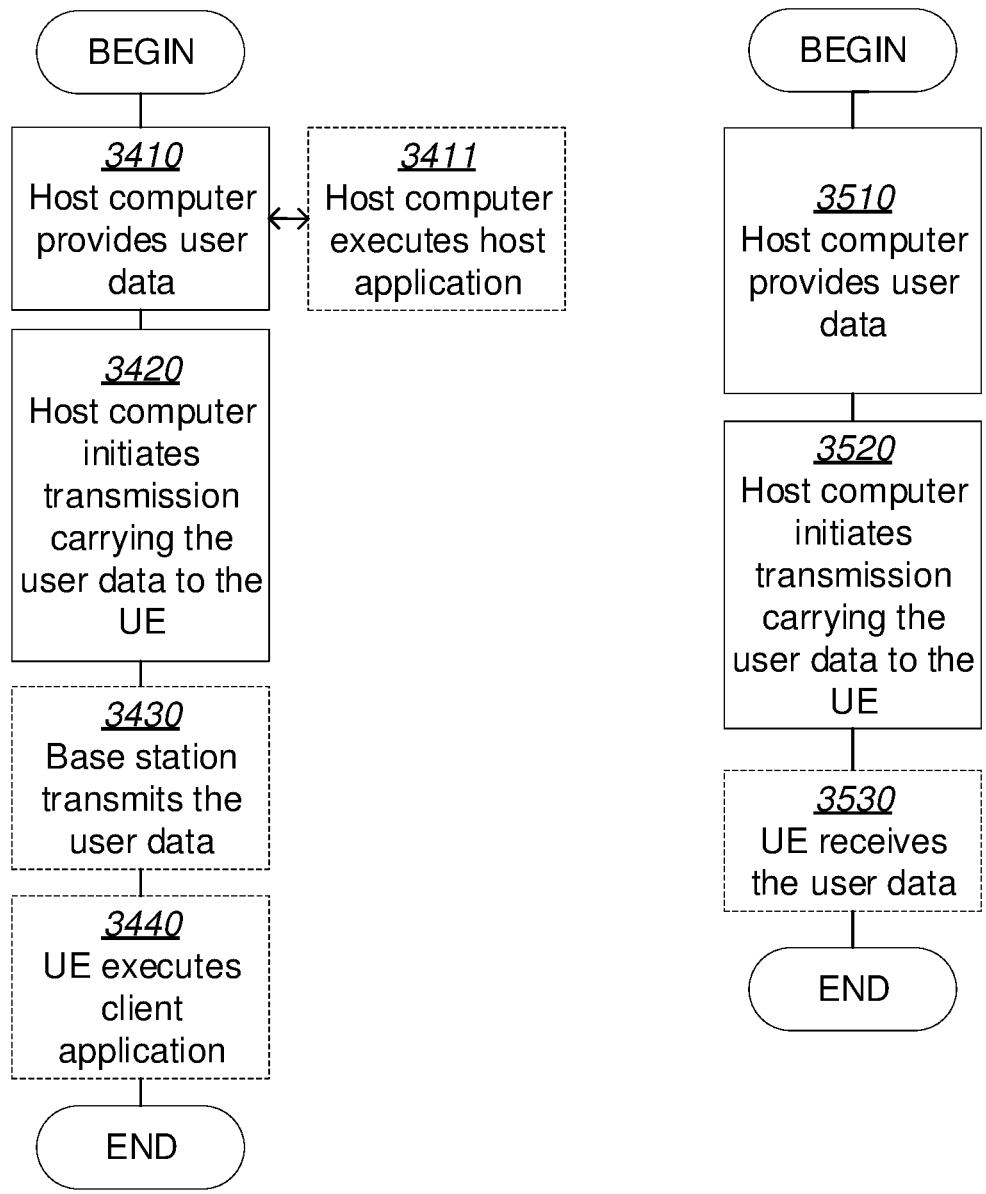

NETWORK NODE AND METHOD IN A WIRELESS COMMUNICATIONS NETWORK

This application is a 35 U.S.C. § 371 national phase filing of International Application No. PCT/SE2019/050369, filed Apr. 23, 2019, the disclosure of which is incorporated herein by reference in its entirety.

TECHNICAL FIELD

Embodiments herein relate to a network node and a methods therein. In particular, they relate to handling a Single User (SU) Multiple Input Multiple Output (MIMO) transmission from a User Equipment (UE) in a wireless communications network.

BACKGROUND

In a typical wireless communication network, wireless devices, also known as wireless communication devices, mobile stations, stations (STA) and/or user equipment (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a W-Fi access point or a radio base station (RBS), which in some networks may also be denoted, for example, a NodeB, eNodeB (eNB), or gNB as denoted in 5th Generation (5G). A service area or cell area is a geographical area where radio coverage is provided by the radio network node. The radio network node communicates over an air interface operating on radio frequencies with the wireless device within range of the radio network node. The radio network node communicates to the wireless device in DownLink (DL) and from the wireless device in UpLink (UL).

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3rd Generation (3G) networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Beamforming and 5G

Multi-antenna systems allow transmitting signals that are focused towards certain spatial regions. This creates beams, also referred to as beam forming, whose coverage may reach beyond transmissions using non-beamformed signals but at the cost of narrower coverage. This is a classic trade-off between distance and angular coverage.

In 5G, radio devices are expected to operate with a large number of antennas referred to as Massive MIMO, offering flexibility and potentially very narrow beams, i.e. with very large focusing gain. Massive MIMO makes a clean break with current practice through the use of a very large number of service antennas that are operated fully coherently and adaptively.

MIMO or Massive MIMO is the a very important technology in both LTE and NR. Uplink Single User (SU) MIMO becomes more and more important since multiple transmission antennas in the UE side will be supported to get spatial multiplexing gain. Single User (SU) MIMO when used herein means a single UE using multiple antennas to transmit uplink data.

Currently, a rank and precoding matrix or precoding matrix indicator (PMI) for uplink SU MIMO is based on reception of Sounding Reference Signals (SRS). The wording rank when used herein means the number of parallel data streams transmitted by the UE. The wording precoding matrix when used herein means the matrix used by the UE for the precoding of the uplink transmission.

The wording PMI when used herein means the precoding matrix indicator to indicate the precoding matrix which is typically sent from network node to the UE.

The SRS may include the whole uplink channel matrix information. The whole uplink channel matrix information when used herein means the channel matrices over the whole bandwidth, herein each channel matrix comprises the channel responses for all the antenna pairs, and each antenna pair means one UE antenna and one network node antenna. However, in both LTE and NR, the SRS capacity is limited, and SRS coverage is also a system limitation.

SUMMARY

An object of embodiments herein is to improve the performance of a wireless communications network using SU MIMO transmissions.

According to a first aspect of embodiments herein, the object is achieved by a method performed by a network node for handling a Single User, SU, Multiple Input Multiple Output, MIMO, transmission from a User Equipment, UE, in a wireless communications network. The network node selects an allowed precoding matrix set for the SU MIMO transmission. The network node further estimates a raw covariance matrix for the SU MIMO transmission, based on a Demodulation Reference Signal, DMRS, of a Physical Uplink Shared Channel, PUSCH, received from the UE 120. The network node then selects a precoding matrix and a rank for the SU MIMO transmission, based on the estimated raw covariance matrix and the selected allowed precoding matrix set.

According to a second aspect of embodiments herein, the object is achieved by a network node configured to handle a Single User, SU, Multiple Input Multiple Output, MIMO, transmission from a User Equipment, UE, in a wireless communications network. The network node is further configured to:

select an allowed precoding matrix set for the SU MIMO transmission, estimate a raw covariance matrix for the SU MIMO transmission, based on a Demodulation Reference Signal, DMRS, of a Physical Uplink Shared Channel, PUSCH, received from the UE 120, and select a precoding matrix and a rank for the SU MIMO transmission, based on the estimated raw covariance matrix and the selected allowed precoding matrix set.

SRS capacity and coverage limitation will not limit the uplink SU MIMO since the rank and precoding matrix selection are based on the DMRS of PUSCH.

The UE power consumption will be less than SRS solution since SRS is not needed. This results in that the performance of a wireless communications network using SU MIMO transmissions is improved.

Yet another advantage of embodiments herein is that for high speed case, more accurate rank and precoding matrix can be estimated based on DMRS, because DMRS is more fresh than SRS, thereby better performance.

BRIEF DESCRIPTION OF THE DRAWINGS

Examples of embodiments herein are described in more detail with reference to attached drawings in which:

FIG. 2 is a flowchart depicting embodiments of a method in a network node.

FIGS. 7 to 10 are flowcharts illustrating methods implemented in a communication system including a host computer, a base station and a user equipment.

DETAILED DESCRIPTION

Embodiments herein are based on the insight that in both LTE and NR, SRS will be used in order to estimate or select the rank and PMI for uplink SU MIMO transmissions. However, both SRS capacity and coverage will be limitation for the system.

Embodiments herein relate to DMRS Based Uplink SU MIMO.

Examples of embodiments herein aims to decouple the uplink SU MIMO transmissions and SRS, in order to remove, for pure DRMS embodiments, or mitigate the dependency to SRS, for mixed SRS and DMRS embodiments.

In an example of the embodiments herein, the PUSCH DMRS is used to:

(1) Select an allowed precoding matrix set for next transmission, (2) estimate the precoded covariance matrix to (3) estimate the raw covariance matrix, and then to (4) select rank for uplink SU MIMO and (5) select precoding matrix for uplink SU MIMO.

In this way, the uplink SU MIMO is decoupled from SRS. This means that uplink SU MIMO can work without using any SRS resource. The SRS capacity and coverage limitation will in this way not limit the uplink SU MIMO because the rank and precoding matrix selection are based on the DMRS of PUSCH. Further, the UE power consumption will be less than SRS solution since SRS is not needed.

The use of mixed SRS and DMRS mode is not excluded.

Figure 1:
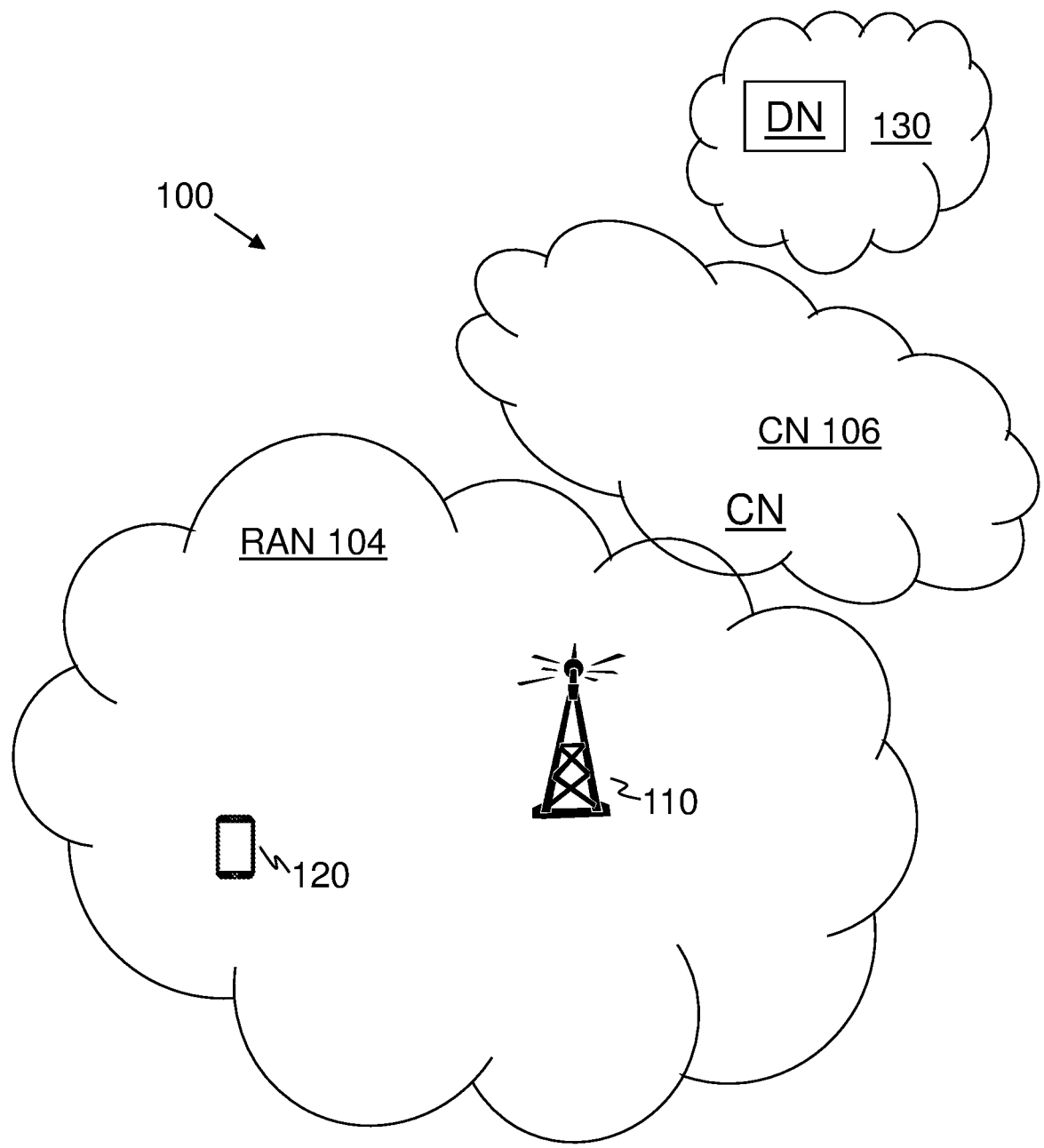
FIG. 1 is a schematic block diagram illustrating embodiments of a wireless communications network.

FIG. 1 is a schematic overview depicting a wireless communications network 100 wherein embodiments herein may be implemented. The wireless communications network 100 comprises one or more RANs 104 and one or more CNs 106. The wireless communications network 100 may use 5G NR but may further use a number of other different technologies, such as, Wi-Fi, (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Network nodes operate in the wireless communications network 100, such as a radio network node 110 providing radio coverage by means of antenna beams, referred to as beams herein.

The radio network node 110 provides radio coverage over a geographical area by means of antenna beams. The geographical area may be referred to as a cell, a service area, beam or a group of beams. The radio network node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE within the cell served by the radio network node 110 depending e.g. on the radio access technology and terminology used.

UEs such as a UE 120 operate in the wireless communication network 100. The UE 120 may e.g. be a mobile station, a non-access point (non-AP) STA, a STA, a user equipment and/or a wireless terminals, an NB-IoT device, an eMTC device and a CAT-M device, a WiFi device, an LTE device and an NR device communicate via one or more Access Networks (AN), e.g. RAN, to one or more core networks (CN). It should be understood by the skilled in the art that "UE" is a non-limiting term which means any terminal, wireless communication terminal, wireless device, Device to Device (D2D) terminal, or node e.g. smart phone, laptop, mobile phone, sensor, relay, mobile tablets or even a small base station communicating within a cell.

The methods according to embodiments herein are performed by the radio network node 110. As an alternative, a Distributed Node (DN) and functionality, e.g. comprised in a cloud 130 as shown in FIG. 1 may be used for performing or partly performing the methods.

Example embodiments of a method performed by a network node 110 for handling a SU MIMO, transmission from a UE 120 in the wireless communications network 100, will now be described with reference to a flowchart depicted in FIG. 2.

The method comprises the following actions, which actions may be taken in any suitable order. Actions that are optional are presented in dashed boxes in FIG. 2.

Action 200

Each PUSCH transmission uses one selected precoding matrix, and typically the network node 110 will inform the UE 120 about the selected precoding matrix transmission by transmission. PUSCH is shared by all UEs in a cell and is used to transmit their data to the network node 110. In some embodiments the network node 110 instructs the UE 120 to use a number of selected precoding matrices to transmit the same number of PUSCH transmissions comprising data and the DMRS. It is one transmission per selected precoding matrix. E.g., M precoding matrices for M transmissions, in a 1 to 1 mapping. This is to estimate the first valid raw covariance matrix after receiving several initial PUSCH transmissions. This may be referred to as initialization.

Action 201

The network node 110 selects an allowed precoding matrix set for the SU MIMO transmission. When used herein, an allowed precoding matrix set is a set of precoding matrices that are allowed to be used for a next SU MIMO transmission. The word "allowed" of the allowed precoding matrix set corresponds to the selection criteria in section "Select allowed precoding matrix set" below. The wording "Select allowed precoding matrix set" may be referred to as to "Select precoding matrix set".

Action 202

In some embodiments, the network node 110 further estimates full rank precoding matrix over a number of Transmission Time Intervals (TTIs). A full rank precoding matrix when used herein is a square matrix which has full matrix rank and consists of one or several precoding matrices. It should be noted that the matrix rank herein is the mathematical concept, not same as the rank of a PUSCH transmission.

Action 203

In some embodiments, the network node 110 estimates a precoded covariance matrix based on channel estimation according to the DMRS of the PUSCH received from the UE 120. A precoded covariance matrix when used herein is a covariance matrix of the precoded channel matrix.

Action 204

The network node 110 then estimates a raw covariance matrix for the SU MIMO transmission. According to embodiments herein, the estimate is based on a DMRS of a PUSCH received from the UE 120. A raw covariance matrix when used herein is a covariance matrix of the channel matrix without any precoding.

In some embodiments as mentioned above, the network node 110 has estimated in Action 202, a full rank precoding matrix over a number of TTIs, and has estimated in Action 203, a precoded covariance matrix based on channel estimation according to the DMRS of the PUSCH received from the UE 120. In these embodiments, the estimation of the raw covariance matrix for the SU MIMO transmission based on the DMRS of the PUSCH received from the UE 120 comprises: estimating 204 the raw covariance matrix for the SU MIMO transmission based on the estimated precoded covariance matrix and the estimated full rank precoding matrix.

When estimating precoded covariance matrix, the full rank precoding matrix may also be obtained at the same time. The full rank precoding matrix together with precoded covariance matrix will be used to estimate the raw covariance matrix.

Action 205 and 206

According to embodiments herein, network node 110 then selects a precoding matrix and a rank for the SU MIMO transmission, based on the estimated raw covariance matrix and the selected allowed precoding matrix set. A precoding matrix when used herein is a matrix used by a UE such as the UE 120 for the precoding of the uplink transmission A rank when used herein is a number of parallel data streams transmitted by the UE 120.

This may be performed by:
selecting in Action 205, a precoding matrix for the SU MIMO transmission, is based on the estimated raw covariance matrix and selected allowed precoding matrix set, and
selecting in Action 206 the rank for the SU MIMO transmission, based on the selected precoding matrix for the SU MIMO transmission.

Action 207

The network node 110 sends to the UE 120, the selected rank, and a precoding matrix indicator based on the selected precoding matrix for the SU MIMO transmission.

Embodiments herein such as mentioned above will now be further described and exemplified. The text below is applicable to and may be combined with any suitable embodiment described above.

The examples of the embodiments herein are mainly described in NR, but they applies to LTE as well.

For the examples below, assume that the number of the antenna of the network node 110 is $M_{BS}$ and number of UE 120 antenna is $M_{UE}$. The maximum number of rank or layer for uplink SU MIMO is $N_R \geq 2$, and note that $N_R \leq M^{UE} \leq M_{BS}$.

For codebook based SU MIMO, pre-defined codebooks are used as in 3GPP. The network node 110 estimates the rank and precoding matrix or PMI, then sends them to UE 120 via uplink grant. A codebook when used herein is a set of precoding matrices which can be used for SU MIMO precoding.

A maximum windows length in terms of number of PUSCH transmission is then defined by the network node 110, such that it equals to $M_{UE}$.

Initialization

As mentioned above, the network node 110 may in some embodiments instruct the UE 120 to use a number of selected precoding matrices to transmit the same number of PUSCH transmissions comprising data and the DMRS. This relates to Action 200 mentioned above.

To initiate a number of M PUSCH transmissions the network node 110 may trigger the initialization. The initialization is used to choose the M precoding matrices for the initial M PUSCH transmissions. The network node 110 will inform the UE 120 to use the selected M precoding matrices to transmit the M PUSCH transmissions which includes the data and DMRS.

The network node 110 chooses M precoding matrix $V_i$, i $\in \{0, M-1\}$ from the codebook, with $1 \leq r_i \leq M_{UE}$ layers, i $\in \{0, M-1\}$, $\Sigma_{i=0}^{M-1} r_i = M_{UE}$ and:

$$\text{rank}(V) = M_{UE} \qquad \text{Equation (1)}$$

V with dimension $M_{UE} \times M_{UE}$ is the matrix which consists of the M matrix $V_i$.

rank(•) is the matrix rank operation. It means V is a full rank matrix.

The M precoding $V_i$ will be used for the M PUSCH transmissions for initialization. For each PUSCH transmission, the UE sends DMRS along with the data in the PUSCH. An example of embodiments will be explained below.

Select Allowed Precoding Matrix Set for Next Transmission

In this action, the network node 110 selects an allowed precoding matrix set for a next SU MIMO transmission. This relates to Action 201 mentioned above.

The network node 110 selects allowed precoding matrices for each rank r (from 1 to $M_{UE}$). The allowed precoding matrices for r depend on the rank of current transmission $r_t$ and the evaluated rank r. If evaluated rank r is big enough, then retrospect is not needed. use equation (2) below or, if precoding matrices information of previous TTIs are needed, then use equation(3) below.

The selected precoding matrices for each rank r comprises the allowed precoding matrix set Φ. The precoding matrix and rank for next transmission will be selected from the matrix.

E.g., assume the $V_{t-k}$ and $r_{t-k}$ are the precoding matrix and rank for PUSCH transmission of TTI t−k, and k ∈ {0, 1, . . . , $M_{UE}$−1}. Note that k=0 is for the current slot t with the precoding matrix $V_t$, and current rank or layer $r_t$ corresponding to $V_t$. Note that t−k is the TTI of the previous $k^{th}$ PUSCH transmission, it may not the exact physical TTI number because PUSCH transmissions may not consecutive.

For rank r ∈ [$M_{UE}$−$r_t$, $M^{UE}$], note the precoding $V_r$ is chosen from the pre-defined codebooks with dimension $M_{UE}$×r and the allowed precoding matrix $V_r$ will satisfy:

$$\text{rank}([V_t, V_r]) = M_{UE} \quad \text{Equation (2)}$$

For rank r ∈ [1, $M_{UE}$−$r_t$), which means r+$r_t$<$M_{UE}$ we find the minimum retrospective TTI number $K_r$, which satisfies $\Sigma_{k=0}^{K_r} r_{t-k} \geq M_{UE}$−r. Then the allowed precoding matrix $V_r$ from the codebooks will satisfy:

$$\text{rank}([V_t, V_r]) = r + \Sigma_{k=0}^{0} r_{t-k} \quad \text{Equation (3)}$$

$$\text{rank}([V_{t-1}, V_t, V_r]) = r + \Sigma_{k=0}^{1} r_{t-k}$$

...

$$\text{rank}([V_{t-K_r}, \ldots, V_{t-1}, V_t, V_r]) = r + \Sigma_{k=0}^{K_r} r_{t-k}$$

Note $V_t = V_{t-0}$, $r_{t-0} = r_t$, and rank(•) is the matrix rank operation.

All the allowed $V_r$ for specific rank r comprises the allowed precoding matrix set Φ, which will be used by the network node 110 to choose the best precoding matrix and rank for next transmission in the section Select rank and precoding matrix for uplink SU MIMO below.

Estimate the Precoded Covariance Matrix and Full Rank Precoding Matrix

In this action, the network node estimates the precoded covariance matrix C, which is based on the channel estimation according to the DMRS of PUSCH. This relates to Actions 202 and 203 mentioned above.

According to the example, the network node 110 estimates and stores the channel matrices based on the DMRS of PUSCH. Then the network node 110 finds the minimum retrospective TTIs to get enough information, both channel matrix and precoding matrix, to construct a precoded covariance matrix C. A channel matrix when used herein means a matrix containing channel responses for all the antenna pairs, and each antenna pair means one UE antenna and one network node antenna. The network node 110 constructs block diagonal elements, and constructs other elements of C accordingly. Block diagonal elements when used herein means the square matrices on the diagonal of C. The network node 110 obtains the full rank precoding matrix V as well.

Note: the DMRS channel estimation method itself is not of interest in this document.

Without loss of generality, in the following description, the network node 110 assumes the granularity is per Resource Block (RB). However embodiments herein may apply to any other granularity.

The network node 110 assumes the estimated channel matrix over PUSCH transmission resource for each transmission of TTI t−k as $H_{b_{t-k}}$, $b_{t-k}$ ∈ $RB_{t-k}$, k ∈ {0,1, . . . , $M_{UE}$−1}. Note that k=0 is for the current slot t with the estimated channel matrices $H_{b_t}$, $b_t$ ∈ $RB_t$, $RB_t$ is the PUSCH RB set of current slot.

Note that above channel matrix H on different RB and different TTI is estimated from the PUSCH DMRS.

The network node 110 finds the minimum retrospective TTI number K, which satisfies $\Sigma_{k=0}^{K} r_{t-k} \geq M_{UE}$ The network node 110 gets the $M_{UE} \times M_{UE}$ matrix V by:

$$V = \{V_t, V_{t-1}, \ldots, \hat{V}_{t-k}\} = \{v_0, v_1, \ldots, v_{M_{UE}-1}\},$$
$$K \leq M_{UE}-1 \quad \text{Equation (4)}$$

where $\hat{V}_{t-K}$ is a subset of $V_{t-K}$ which can satisfy rank(V)=$M_{UE}$.

Then the network node 110 constructs the uplink precoded covariance matrix C as follows.

The network node 110 calculates the covariance $C_t$, $C_{t-1}$, . . . , $\hat{C}_{t-K}$ as:

$$C_{t-k} = \frac{1}{N_{t-k}} \Sigma_{b_{t-k} \in RB_{t-k}} H_{b_{t-k}}^H H_{b_{t-k}} \quad \text{Equation (5)}$$

where $N_{t-k}$ is the number of RB of PUSCH in TTI t−k. And $\hat{C}_{t-K}$ is the subset of $C_{t-K}$ by choosing the corresponding precoding matrices.

Then the network node 110 fills $C_t$, $C_{t-1}$, . . . , $\hat{C}_{t-k}$ into C block diagonally from $C_{0,0}$ to $C_{M_{UE}-1, M_{UE}-1}$.

For the other elements $c_{i,j}$ in C, which means the corresponding precoding matrices $v_i$ and $v_j$ are in different TTIs, note as t−$k_i$ and t−$k_j$. Note the intersection of $RB_{t-k_i}$ and $RB_{t-k_j}$ is $RB_{i,j}$.

If $RB_{i,j}$ is not empty:

$$c_{i,j} = \frac{1}{N_{i,j}} \Sigma_{b_{t-k_i}, b_{t-k_j} \in RB_{i,j}} h_{b_{t-k_i}}^H h_{b_{t-k_j}} \quad \text{Equation (6)}$$

else, choose the nearest RB indexes in $RB_{t-k_i}$ and $RB_{t-k_j}$, note as $rb_i$ and $rb_j$:

$$c_{i,j} = \Sigma h_{rb_i}^H h_{rb_j} \quad \text{Equation (7)}$$

where $h_{b_{t-ki}}$ and $h_{rb_i}$ are the channel matrix corresponding to precoding matrix $v_i$, $h_{b_{t-kj}}$ and $h_{rb_j}$ are the channel matrix corresponding to precoding matrix $v_j$.

The network node 110 gets $c_{j,i} = c_{i,j}^H$ because is C Hermitian matrix.

Then the network node 110 gets the uplink precoded covariance matrix C with dimension $M_{UE} \times M_{UE}$.

Estimate the Raw Covariance Matrix

In this action, the network node 110 estimates, also referred to as recovers, the raw covariance matrix $C_{UE}$ according to the precoded covariance matrix C and the full rank precoding matrix V in the section Estimate the precoded covariance matrix and full rank precoding matrix. This relates to Actions 204 mentioned above. The raw covariance matrix is the covariance matrix in terms of the raw channel matrix from the UE antennas to the network node 110 antennas, without any precoding.

The uplink raw covariance matrix $C_{UE}$ essentially represents the spatial correlation of the UE's transmission antennas, it may be estimated as:

$$C_{UE} = (V^{-1})^H C V^{-1} \quad \text{Equation (8)}$$

where V is the full rank precoding matrix and C is the precoded covariance matrix in mentioned above.

The matrix $C_{UE}$ is used to choose the best precoding matrix and rank for next transmissions.

Select Rank and Precoding Matrix for Uplink SU MIMO

In this action the network node 110 selects the rank and the precoding matrix for uplink SU MIMO for next transmission. This relates to Actions 205 and 206 mentioned above. The network node 110 evaluates every precoding matrix in the precoding matrix set Φ, and then chooses the precoding matrix which has the highest capacity. During the evaluation, the raw covariance matrix $C_{UE}$ is used together with each precoding matrix. Once the precoding matrix is selected, the rank is also selected because the selected precoding matrix is mapped to a specific rank.

Note that the rank and precoding matrix are selected by the raw covariance matrix $C_{UE}$ and the precoding matrix set $\Phi$.

According to $C_{UE}$ and precoding matrix set $\Phi$ in previous sections, it is possible for the network node 110 to get the best precoding matrix and corresponding rank as:

$$V_{best} = \arg\max_{v_i \in \Phi}[\text{capacity}(V_i^H C_{UE} V_i)] \quad \text{Equation (9)}$$

Where $\Phi$ is the total precoding matrix set including all possible ranks, and capacity(•) is the channel capacity metric in terms of different criterions.

Note that the function of capacity(•) in (9) is not novel, many criterions can be utilized.

Implementation Example

In this example it is assumed that the UE 120 has 2 transmission antennas with max uplink rank 2. The precoding matrix from 3GPP are given as follows:

Rank 1:

| TPMI | Precoding matrix $V_i$ ordered from left to right in increasing order of TPMI index | | | | | |
|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ |

Rank 2, TPMI Uses 6-8 to be Distinguished with Rank 1 Table:

| TPMI | Precoding matrix $V_i$ ordered from left to right in increasing order of TPMI index | | |
|---|---|---|---|
| 6-8 | $\frac{1}{\sqrt{2}}\begin{bmatrix}1 & 0\\0 & 1\end{bmatrix}$ | $\frac{1}{2}\begin{bmatrix}1 & 1\\1 & -1\end{bmatrix}$ | $\frac{1}{2}\begin{bmatrix}1 & 1\\j & -j\end{bmatrix}$ |

For initialization, the network node 110 chooses $V_0$ and $V_1$ for 2 PUSCH transmissions.

For current TTI t, it is assumed that current rank is 1 and current precoding matrix is $$V_3 = \frac{1}{\sqrt{2}}\begin{bmatrix}1\\-1\end{bmatrix}.$$

And for TTI t−1, the rank is 1 and precoding matrix is $$V_2 = \frac{1}{\sqrt{2}}\begin{bmatrix}1\\1\end{bmatrix}.$$

For simplification, it is assumed that same RB sets are used for t and t−1, note as $RB_t$, and $N_t$ is the number of used RB. Note that algorithm above covers other cases.

The network node 110 selects the precoding matrix set for next transmission:

For rank r=1 and r=2, we choose the precoding matrix to satisfy:

$$\text{rank}([V_3, V_r]) = 2 \quad \text{Equation (10)}$$

So for r=1, $V_0$, $V_1$, $V_2$, $V_4$, $V_5$ are allowed for next transmission. For r=2, $V_6$, $V_7$, $V_8$ are allowed for next transmission.

Then the precoding matrix set $\Phi = \{V_0, V_1, V_2, V_4, V_5, V_6, V_7, V_8\}$ The network node 110 finds minimum retrospective TTI number K=1, and gets the 2×2 matrix $$V = \{V_3, V_2\} = \frac{1}{\sqrt{2}}\begin{bmatrix}1 & 1\\-1 & 1\end{bmatrix}.$$

The network node 110 gets the 2×2 uplink precoded covariance matrix C as follows, note that it is assumed both TTI t and t−1 use $RB_t$ for simplification:

$$c_{0,0} = \frac{1}{N_t}\sum_{b_t \in RB_t} H_{b_t}^H H_{b_t} \quad \text{Equation (11)}$$

$$c_{1,1} = \frac{1}{N_t}\sum_{b_t \in RB_t} H_{b_{t-1}}^H H_{b_{t-1}}$$

$$c_{0,1} = \frac{1}{N_t}\sum_{b_t \in RB_t} H_{b_t}^H H_{b_{t-1}}$$

$$c_{1,0} = c_{0,1}^H$$

The network node 110 gets 2×2 uplink raw covariance matrix $$C_{UE} = (V^{-1})^H C V^{-1} = \frac{1}{2}\begin{bmatrix}1 & 1\\-1 & 1\end{bmatrix} C \begin{bmatrix}1 & -1\\1 & 1\end{bmatrix}.$$

Then the network node 110 may use $C_{UE}$ and $\Phi$ to choose the rank and precoding matrix for next transmission based on the section Select rank and precoding matrix for uplink SU MIMO above or any other criterion.

Figure 3:
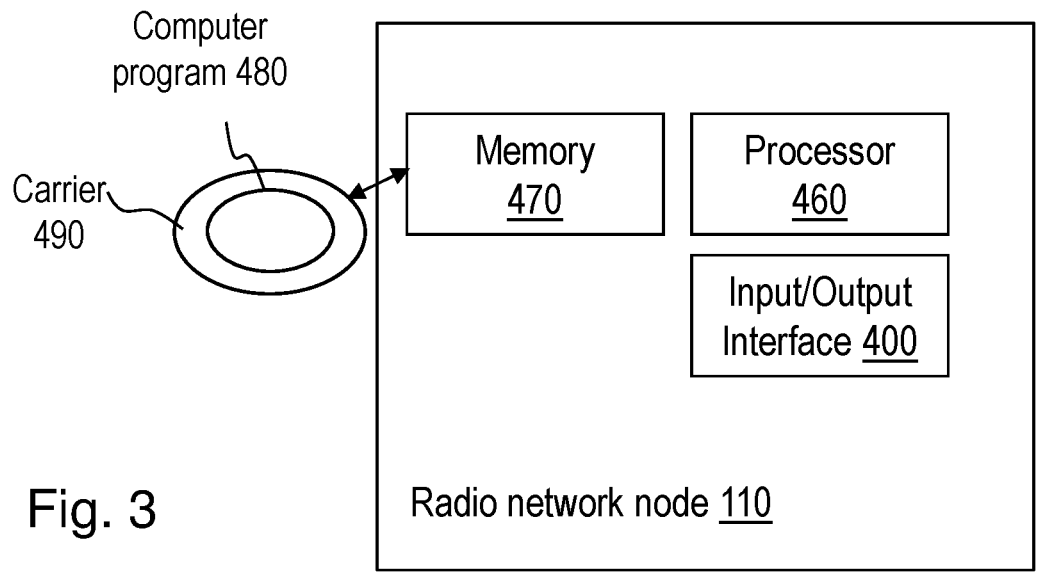
FIG. 3 is a schematic block diagram illustrating embodiments of a network node.
Figure 4:
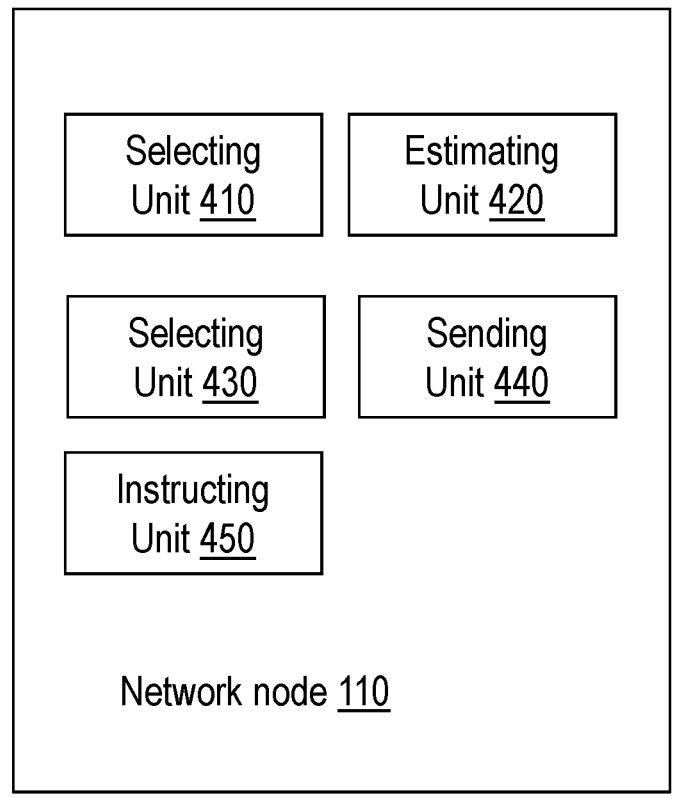
FIG. 4 is a schematic block diagram illustrating embodiments of a network node.

To perform the method actions above for handle an SU MIMO transmission from the UE 120 in the wireless communications network 100, the network node 110 may comprise the arrangement depicted in FIG. 3 and FIG. 4.

The network node 110 may comprise an input and output interface 400 depicted in FIG. 3, configured to communicate e.g. with the UE 120. The input and output interface 400 may comprise a wireless receiver (not shown) and a wireless transmitter (not shown).

The network node 110 is configured to, e.g. by means of a selecting unit 410 in the network node 110 depicted in FIG. 4, select an allowed precoding matrix set for the SU MIMO transmission.

The network node 110 is further configured to, e.g. by means of an estimating unit 420 in the network node 110 depicted in FIG. 4, estimate a raw covariance matrix for the SU MIMO transmission, based on a DMRS of a PUSCH received from the UE 120.

The network node 110 is further configured to, e.g. by means of an selecting unit 430 in the network node 110 depicted in FIG. 4, select a precoding matrix and a rank for the SU MIMO transmission, based on the estimated raw covariance matrix and the selected allowed precoding matrix set.

In some embodiments, the network node 110 is further configured to, e.g. by means of the estimating unit 420 in the network node 110, estimate full rank precoding matrix over a number of TTIs and estimate a precoded covariance matrix based on channel estimation according to the DMRS of the PUSCH received from the UE 120. In these embodiments, the network node 110 may further be configured to, e.g. by means of the estimating unit 420 in the network node 110, estimate the raw covariance matrix for the SU MIMO transmission, based on the DMRS of the PUSCH received from the UE 120 by estimating the raw covariance matrix for the SU MIMO transmission based on the estimated precoded covariance matrix and the estimated full rank precoding matrix.

In some embodiments, the network node 110 is further configured to e.g. by means of the selecting unit 430 in the network node 110, select the precoding matrix and the rank for the SU MIMO transmission, based on the estimated raw covariance matrix and the selected allowed precoding matrix set by: Selecting a precoding matrix for the SU MIMO transmission, is based on the estimated raw covariance matrix and selected allowed precoding matrix set, and selecting the rank for the SU MIMO transmission, is based on the selected 205 a precoding matrix for the SU MIMO transmission.

In some embodiments, the network node 110 is further configured to e.g. by means of a sending unit 440 in the network node 110 depicted in FIG. 4, send to the UE 120, the selected rank and a precoding matrix indicator based on the selected precoding matrix for the SU MIMO transmission.

In some embodiments, the network node 110 is further configured to e.g. by means of an instructing unit 450 in the network node 110 depicted in FIG. 4, instruct the UE 120 to use a number of selected precoding matrices to transmit the same number of PUSCH transmissions comprising data and the DMRS.

The embodiments herein may be implemented through a respective processor or one or more processors, such as a processor 460 of a processing circuitry in the network node 110 depicted in FIG. 3, together with a respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 470 comprising one or more memory units to store data on. The memory comprises instructions executable by the processor 460. The memory 470 is arranged to be used to store e.g. allowed precoding matrix set, precoded covariance matrix, raw covariance matrix, precoded covariance matrix raw covariance matrix, rank, precoding matrix data, configurations and applications to perform the methods herein when being executed in the network node 110.

Those skilled in the art will also appreciate that the units in the radio network node 110 mentioned above may refer to a combination of analogue and digital circuits, and/or one or more processors configured with software and/or firmware, e.g. stored in the network node 110 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 480 comprises instructions, which when executed by the respective at least one processor 460, cause the at least one processor 460 of the network node 110 to perform the actions above.

In some embodiments, a carrier 490 comprises the computer program 480, wherein the carrier 490 is one of an electronic signal, an optical signal, an electromagnetic signal, a magnetic signal, an electric signal, a radio signal, a microwave signal, or a computer-readable storage medium.

Further Extensions and Variations

Figure 5:
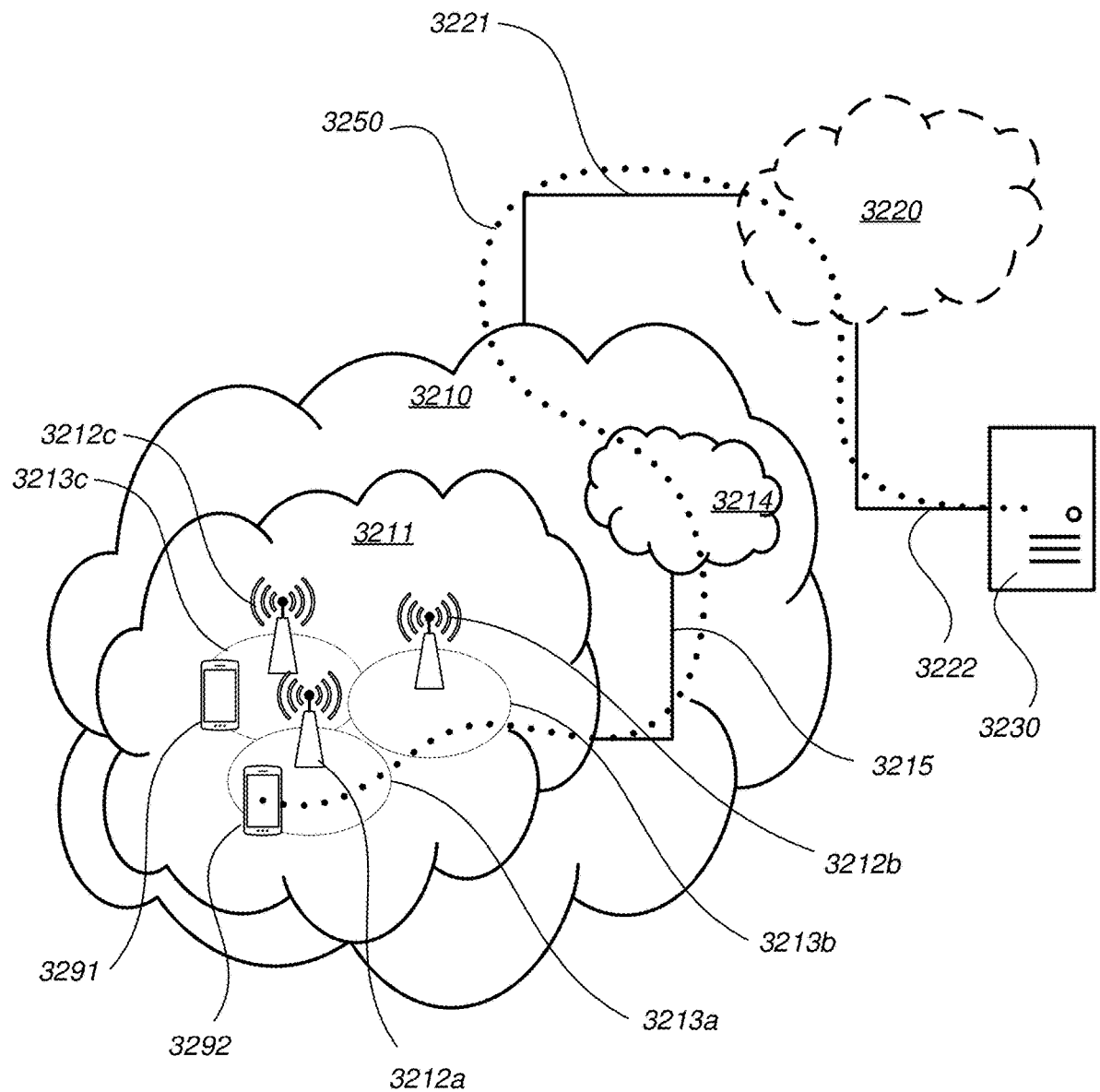
FIG. 5 schematically illustrates a telecommunication network connected via an intermediate network to a host computer.

With reference to FIG. 5, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212a, 3212b, 3212c, such as the radio network node 110, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the wireless devices 120 such as a Non-AP STA 3291 located in coverage area 3213c is configured to wirelessly connect to, or be paged by, the corresponding base station 3212c. A second UE 3292 e.g. the first or second radio node 110, 120 or such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 5 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 6. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 6) served by the base station 3320. The communication interface 3326 may be configured to facilitate a connection 3360 to the host computer 3310. The connection 3360 may be direct or it may pass through a core network (not shown in FIG. 6) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing 35 circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 6:
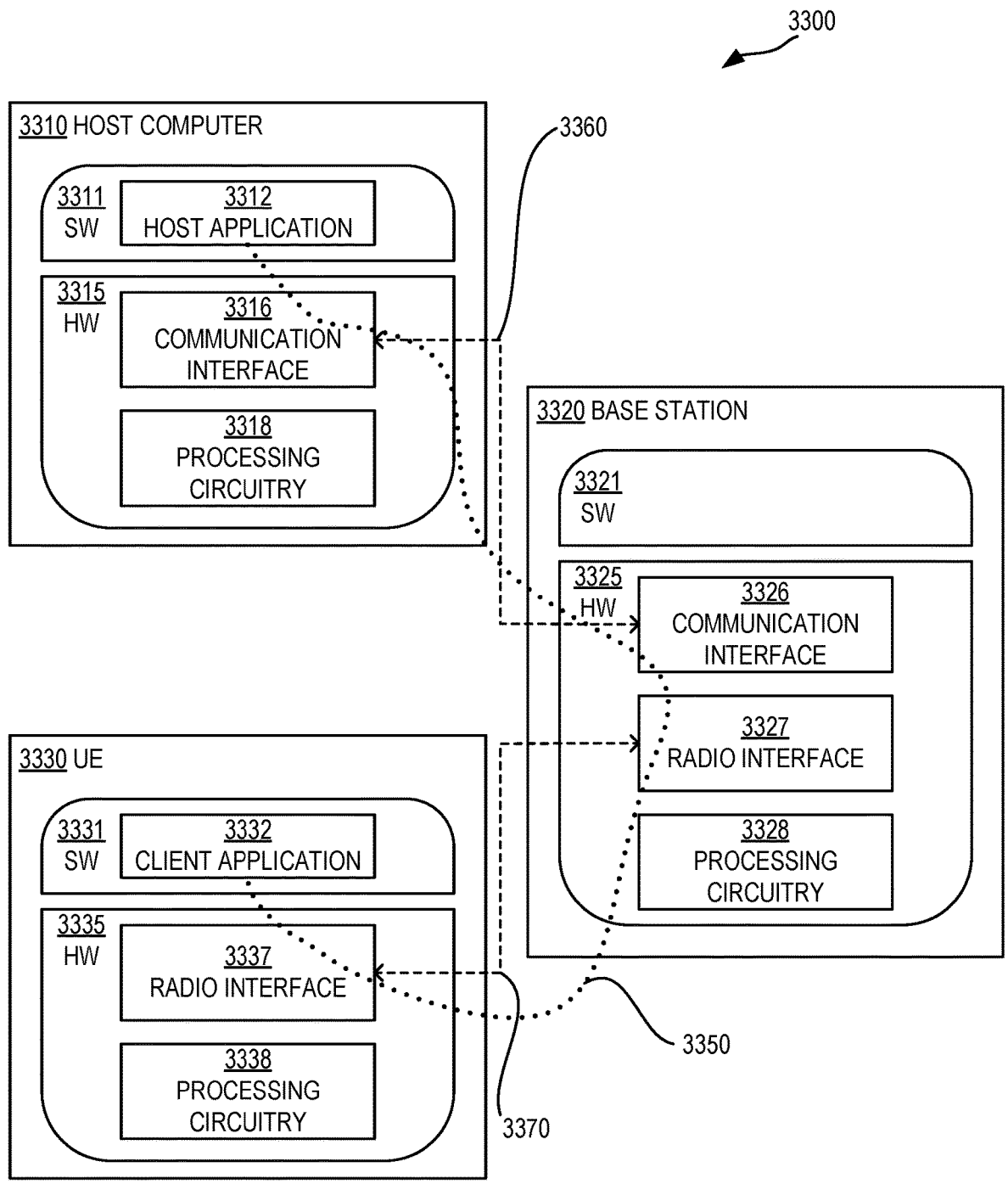
FIG. 6 is a generalized block diagram of a host computer communicating via a base station with a user equipment over a partially wireless connection.

It is noted that the host computer 3310, base station 3320 and UE 3330 illustrated in FIG. 6 may be identical to the host computer 3230, one of the base stations 3212a, 3212b, 3212c and one of the UEs 3291, 3292 of FIG. 5, respectively. This is to say, the inner workings of these entities may be as shown in FIG. 6 and independently, the surrounding network topology may be that of FIG. 5.

In FIG. 6, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 7 is a flowchart illustrating a method implemented in a communication system, in accordance with one embodiment. The communication system includes a host computer, a base station such as an AP STA, and a UE such as a Non-AP STA which may be those described with reference to FIG. 5 and FIG. 6. For simplicity of the present disclosure, only drawing references to FIG. 7 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 8 is a flowchart illustrating a method implemented in a communication system, in accordance with one embodiment. The communication system includes a host computer, a base station such as an AP STA, and a UE such as a Non-AP STA which may be those described with reference to FIG. 5 and FIG. 6. For simplicity of the present disclosure, only drawing references to FIG. 8 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figures 9, 10:
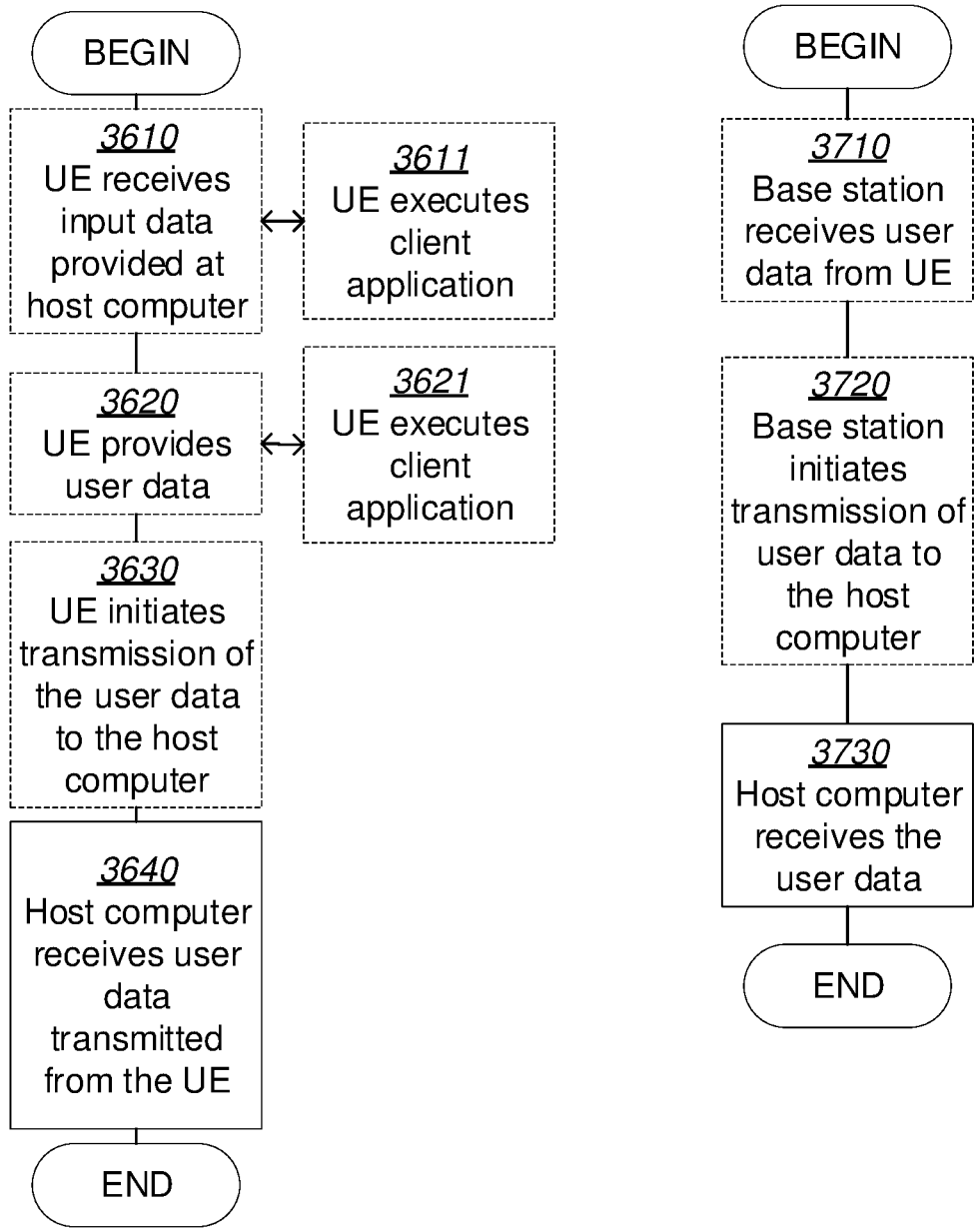

FIG. 9 is a flowchart illustrating a method implemented in a communication system, in accordance with one embodiment. The communication system includes a host computer, a base station such as an AP STA, and a UE such as a Non-AP STA which may be those described with reference to FIG. 5 and FIG. 6. For simplicity of the present disclosure, only drawing references to FIG. 9 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 10 is a flowchart illustrating a method implemented in a communication system, in accordance with one embodiment. The communication system includes a host computer, a base station such as an AP STA, and a UE such as a Non-AP STA which may be those described with reference to FIG. 5 and FIG. 6. For simplicity of the present disclosure, only drawing references to FIG. 10 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a network node for handling a Single User, SU, Multiple Input Multiple Output, MIMO, transmission from a User Equipment, UE, in a wireless communications network, the method comprising:
  selecting an allowed precoding matrix set for the SU MIMO transmission,
  estimating a full rank precoding matrix over a number of Transmission Time Intervals, TTIs,
  estimating a precoded covariance matrix based on channel estimation according to a Demodulation Reference Signal, DMRS, of a Physical Uplink Shared Channel, PUSCH, received from the UE,
  estimating a raw covariance matrix for the SU MIMO transmission based on the DMRS of the PUSCH received from the UE wherein estimating the raw covariance matrix for the SU MIMO transmission based on the DMRS of the PUSCH received from the UE comprises estimating the raw covariance matrix for the SU MIMO transmission based on the estimated precoded covariance matrix and the estimated full rank precoding matrix, and selecting a precoding matrix and a rank for the SU MIMO transmission based on the estimated raw covariance matrix and the selected allowed precoding matrix set.

2. The method according to claim 1, wherein selecting the precoding matrix and the rank for the SU MIMO transmission based on the estimated raw covariance matrix and the selected allowed precoding matrix set is performed by:

selecting the precoding matrix for the SU MIMO transmission based on the estimated raw covariance matrix and the selected allowed precoding matrix set, and selecting the rank for the SU MIMO transmission based on the selected precoding matrix for the SU MIMO transmission.

3. The method according to claim 1, further comprising: sending, to the UE, the selected rank and a precoding matrix indicator based on the selected precoding matrix for the SU MIMO transmission.

4. The method according to claim 1, further comprising: instructing the UE to use a number of selected precoding matrices to transmit the same number of PUSCH transmissions comprising data and the DMRS.

5. A non-transitory computer readable medium comprising instructions, which when executed by a processor, causes the processor to:

select an allowed precoding matrix set for a Single User, SU, Multiple Input Multiple Output, MIMO, transmission, estimate a full rank precoding matrix over a number of Transmission Time Intervals, TTIs, estimate a precoded covariance matrix based on channel estimation according to a Demodulation Reference Signal, DMRS, of a Physical Uplink Shared Channel, PUSCH, received from a User Equipment, UE, estimate a raw covariance matrix for the SU MIMO transmission based on the DMRS of the PUSCH received from the UE wherein estimating the raw covariance matrix for the SU MIMO transmission based on the DMRS of the PUSCH received from the UE comprises estimating the raw covariance matrix for the SU MIMO transmission based on the estimated precoded covariance matrix and the estimated full rank precoding matrix, and select a precoding matrix and a rank for the SU MIMO transmission based on the estimated raw covariance matrix and the selected allowed precoding matrix set.

6. A network node configured to handle a Single User, SU, Multiple Input Multiple Output, MIMO, transmission from a User Equipment, UE, in a wireless communications network, the network node comprising:

a non-transitory computer readable medium comprising instructions, and at least one processor, wherein in response to executing the instructions, the at least one processor is configured to:

select an allowed precoding matrix set for the SU MIMO transmission, estimate a full rank precoding matrix over a number of Transmission Time Intervals, TTIs, estimate a precoded covariance matrix based on channel estimation according to a Demodulation Reference Signal, DMRS, of a Physical Uplink Shared Channel, PUSCH, received from the UE, estimate a raw covariance matrix for the SU MIMO transmission based on the DMRS of the PUSCH received from the UE wherein estimating the raw covariance matrix for the SU MIMO transmission based on the DMRS of the PUSCH received from the UE comprises estimating the raw covariance matrix for the SU MIMO transmission based on the estimated precoded covariance matrix and the estimated full rank precoding matrix, and select a precoding matrix and a rank for the SU MIMO transmission based on the estimated raw covariance matrix and the selected allowed precoding matrix set.

7. The network node according to claim 6, wherein in response to executing the instructions, the at least one processor is further configured to select the precoding matrix and the rank for the SU MIMO transmission based on the estimated raw covariance matrix and the selected allowed precoding matrix set by:

selecting the precoding matrix for the SU MIMO transmission based on the estimated raw covariance matrix and the selected allowed precoding matrix set, and selecting the rank for the SU MIMO transmission based on the selected precoding matrix for the SU MIMO transmission.

8. The network node according to claim 6, wherein in response to executing the instructions, the at least one processor is further configured to:

send, to the UE, the selected rank and a precoding matrix indicator based on the selected precoding matrix for the SU MIMO transmission.

9. The network node according to claim 6, wherein in response to executing the instructions, the at least one processor is further configured to:

instruct the UE to use a number of selected precoding matrices to transmit the same number of PUSCH transmissions comprising data and the DMRS.

* * * * *